United States Patent
Signorello et al.

(10) Patent No.: US 12,392,714 B2
(45) Date of Patent: Aug. 19, 2025

(54) OPTICAL ALIGNMENT COMPENSATION SYSTEM FOR A GAS DETECTION SYSTEM

(71) Applicants: IMEC VZW, Leuven (BE); Universiteit Gent, Ghent (BE)

(72) Inventors: Giorgio Signorello, Zurich (CH); Orges Furxhi, Fort Collins, CO (US); Joris Van Campenhout, Leuven (BE); Anton Vasiliev, Bredene (BE); Olivier Rousseaux, Oud-Heverlee (BE)

(73) Assignees: IMEC VZW, Leuven (BE); Universiteit Gent, Ghent (BE)

( * ) Notice: Subject to any disclaimer, the term of this patent is extended or adjusted under 35 U.S.C. 154(b) by 213 days.

(21) Appl. No.: 18/027,679

(22) PCT Filed: Sep. 27, 2021

(86) PCT No.: PCT/EP2021/076478
§ 371 (c)(1),
(2) Date: Mar. 22, 2023

(87) PCT Pub. No.: WO2022/064032
PCT Pub. Date: Mar. 31, 2022

(65) Prior Publication Data
US 2024/0077411 A1    Mar. 7, 2024

(30) Foreign Application Priority Data
Sep. 28, 2020 (EP) .................... 20198630

(51) Int. Cl.
*G01N 21/27* (2006.01)
(52) U.S. Cl.
CPC ... *G01N 21/274* (2013.01); *G01N 2201/0636* (2013.01)

(58) Field of Classification Search
CPC ......... G01N 21/274; G01N 2201/0636; G01N 21/3504; G01N 2021/0314; G01N 2021/3513
See application file for complete search history.

(56) References Cited

U.S. PATENT DOCUMENTS

| | | |
|---|---|---|
| 9,784,921 B1 | 10/2017 | Zhang et al. |
| 2011/0150388 A1* | 6/2011 | Shin ..................... G02B 6/3556 385/16 |

(Continued)

FOREIGN PATENT DOCUMENTS

| | | | |
|---|---|---|---|
| GB | 2269655 A | 2/1994 | |
| GB | 2269665 A * | 2/1994 | ........... G08B 17/103 |

OTHER PUBLICATIONS

Yang D. et al. "Fabrication of a 4 × 4 strictly nonblocking SOI switch matrix", Optics Communications, Elsevier, Amsterdam, NL. vol. 250, No. 1-3, Jun. 1, 2005, pp. 48-53, XP027634020.

(Continued)

*Primary Examiner* — Michael A Lyons
(74) *Attorney, Agent, or Firm* — The H.T. Than Law Group (57) ABSTRACT

The present disclosure relates to an optical alignment compensation system for a gas detection system, in particular, to an integrated alignment compensation system for an open-path gas sensing system. The optical alignment compensation system of the disclosure is able to compensate for unwanted drifts of a retroreflector. The optical alignment system comprises an array of transceiver pairs, wherein each transceiver pair is configured to transmit and receive light with an optical spectrum in an absorption region of a gas to be detected. Further, it comprises a retroreflector arranged at a nominal position and configured to reflect the light. Further, it comprises an optical element arranged and configured to direct the light from at least one of the transceiver (Continued)

pairs along an optical path through the gas to the retroreflector, to receive the light reflected by the retroreflector along the optical path, and to direct the reflected light to the respective transceiver pair. Further, it comprises a control unit configured to select one of the transceiver pairs for transmitting and receiving the light, wherein the control unit is configured to select the transceiver pair that receives the reflected light with the highest signal response.

14 Claims, 10 Drawing Sheets

(56) References Cited

U.S. PATENT DOCUMENTS

| | | | |
|---|---|---|---|
| 2014/0354846 A1* | 12/2014 | Muguruma | H04N 25/70 348/222.1 |
| 2018/0172580 A1 | 6/2018 | Bjorøy | |
| 2019/0056311 A1 | 2/2019 | Sawyers | |

OTHER PUBLICATIONS

International Search Report issued in connection with the corresponding International Application No. PCT/EP2021/076478 on Nov. 22, 2021.

* cited by examiner

OPTICAL ALIGNMENT COMPENSATION SYSTEM FOR A GAS DETECTION SYSTEM

TECHNICAL FIELD

The present disclosure relates to an optical alignment compensation system for a gas detection system, for instance, an open-path gas sensing system. In particular, the disclosure relates to an integrated alignment compensation system, wherein at least some of the components of the system are integrated, for example, into an optical chip. The optical alignment compensation system of the disclosure is able to compensate for unwanted misalignment due to environmental factors.

BACKGROUND OF THE INVENTION

As the world population increases, so does the demand for energy. Natural gas is a key energy source to meet this increasing energy demand. One of the most abundant elements of natural gas is methane, which is the cleanest burning fossil fuel. However, when methane is leaked into the atmosphere it has a global warming potential (GWP20) that is 86 times higher than that of carbon dioxide.

Accordingly, in order to prevent methane—or any other similar natural gas—from leaking into the atmosphere, the oil and gas industry needs to monitor the gas production facilities and, in particular, hundreds of thousands of small natural gas production facilities. These gas production facilities are typically located in remote places, where access to an energy grid infrastructure is scarce or absent, and where the cost of human intervention and equipment maintenance is high. Thus, automation of monitoring such gas production facilities is desired. For the automation of the monitoring, sensor units need to be easy to install and need to operate in a robust way. In particular, they should operate robustly even under large variations in temperature, pressure, humidity, and other environmental factors.

Figure 1:
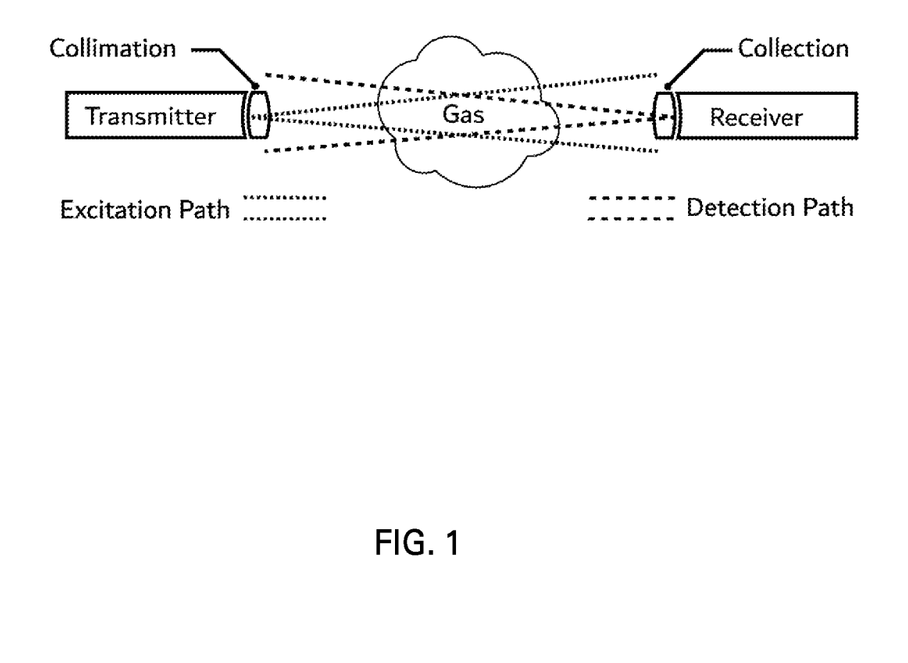
FIG. 1 shows an example of a gas detection system.

An example of a gas detection system, which can be used for the monitoring a gas production facility, involves the use of one or more lasers, and is shown in FIG. 1. The laser light is in this example selected such that it can be absorbed by the gas to be detected. In addition to the laser, such a gas detection system requires at least two components, namely at least one transmitter for transmitting the laser light, and at least one receiver for receiving the laser light. Both the receiver and the transmitter may be equipped with lenses and optical systems to define and confine the direction of emission of the laser light (for the transmitter) or the direction of the collection of the light (for the receiver). A gas located in the path between the transmitter and the receiver can be analyzed, since the laser light transmitted by the transmitter is absorbed by the gas (e.g., the gas may be excited by the laser light), and only the remaining laser light after absorption is received by the receiver.

Figure 2:
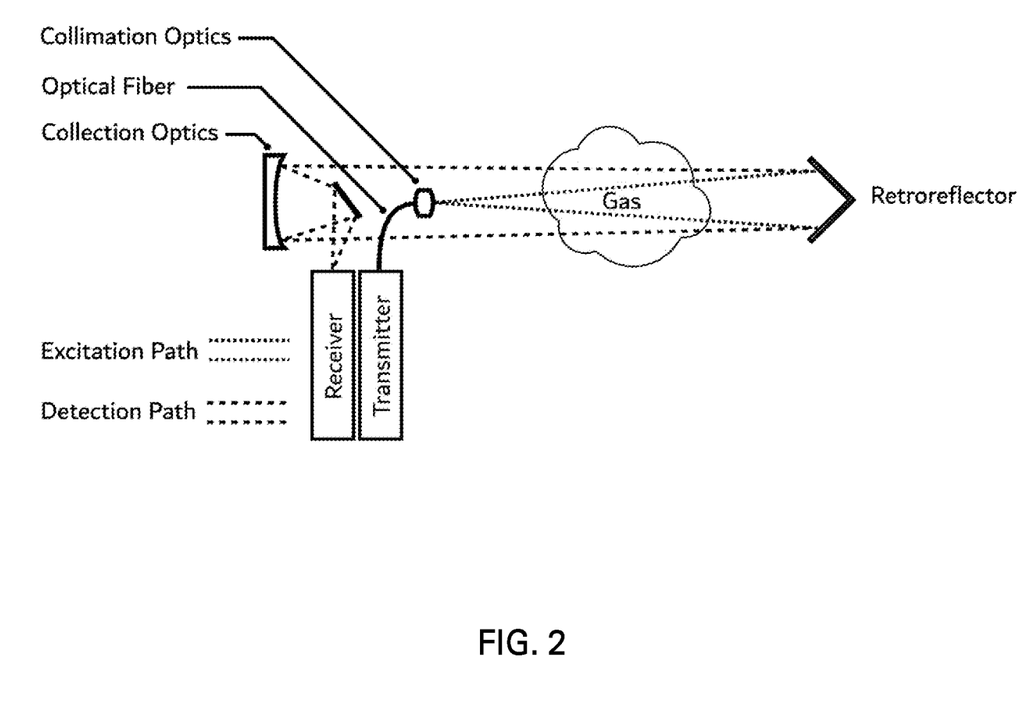
FIG. 2 shows an example of a colocated gas detection system.

Thereby, the transmitter and the receiver can be located in separate units (as shown in FIG. 1), or can be built within the same sensor unit (as shown in FIG. 2), i.e., they can be colocated. If they are colocated, in this disclosure the transmitter and the receiver are said to form a transceiver pair. When using a system with such a transceiver pair, a retroreflector is needed in the optical path, in order to enable the overlap of the excitation and the detection path (i.e., the light transmitted by the transmitted has to be received, after possible interaction with the gas, by the receiver) for the system to operate nominally. Such a colocated system has the advantage that only one sensor unit (including the transceiver pair) has to be positioned and aligned accurately. This decreases significantly the capital cost of the installation—because only one sensing unit needs to be produced—as well as the operational cost of the installation—because of the simplified alignment procedure. Further, the colocated system is advantageous also in terms of sensitivity. Since the light travels twice through the region where the gas and the optical paths intersect, a stronger light-gas interaction (in this example absorption) is achieved, as well as stronger signals and lower limits of detection.

Figure 3:
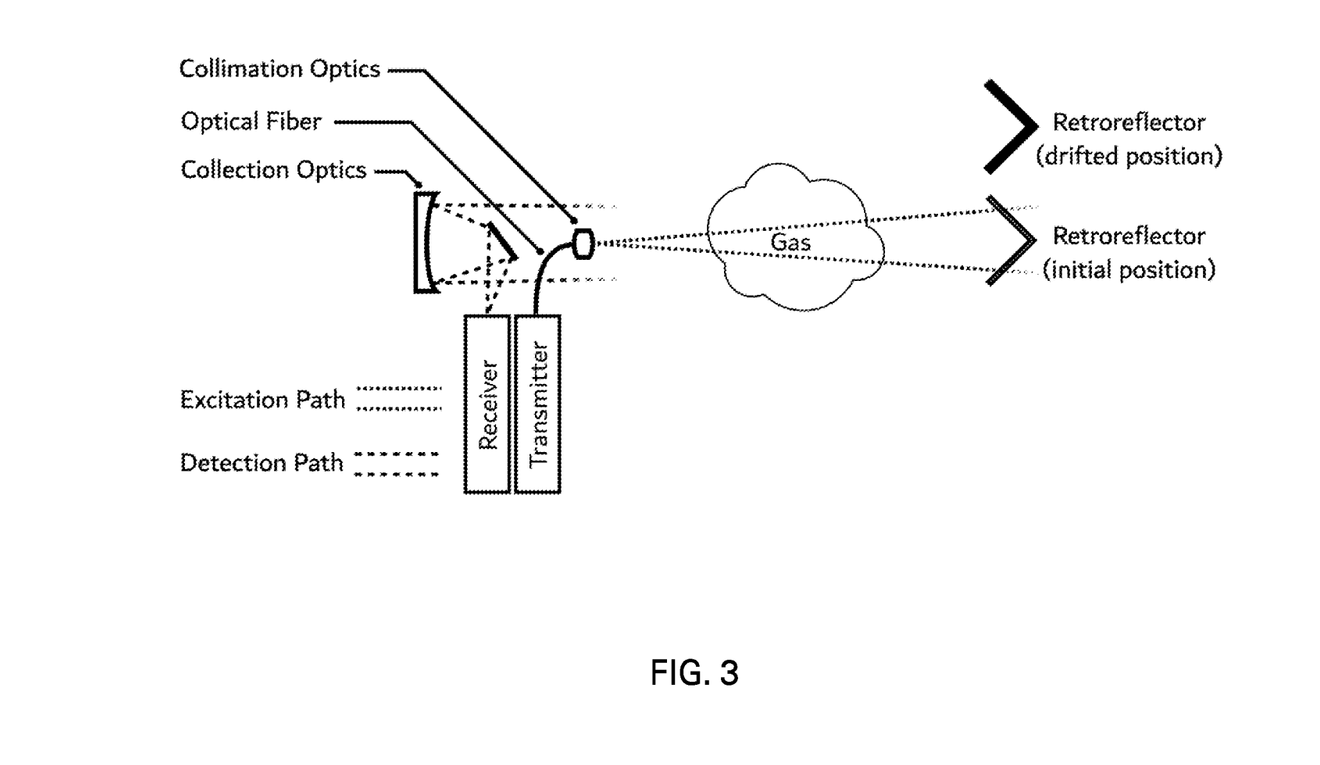
FIG. 3 shows an example of a colocated gas detection system, and a problematic drift of a retroreflector.

As further shown in FIG. 3, the gas detection system performs optimally, if an accurate alignment is achieved between the retroreflector and the sensor unit (which includes the transceiver pair). However, when it is deployed in the field, the gas detection systems typically experiences large changes in environmental conditions, such as variations in temperature, pressure and/or humidity, and is accordingly subject to phenomena associated to such environmental changes. For example, thermal expansion may cause mechanical drifts (as shown, particularly a drift of the retroreflector) resulting in misalignment. Any misalignment can further lead to a lack of functionality of the sensor unit, and even to a temporary loss of situational awareness for the section of the gas production facility, which is covered by the sensor unit. For a simple gas detection system, such a misalignment may be corrected via manual intervention. However, maintenance personnel is a major source of operational costs and, in particular, a manual re-alignment is rather time-consuming and requires well-trained personnel. Further, a re-calibration of the sensor unit may be required after the re-alignment.

Figure 4:
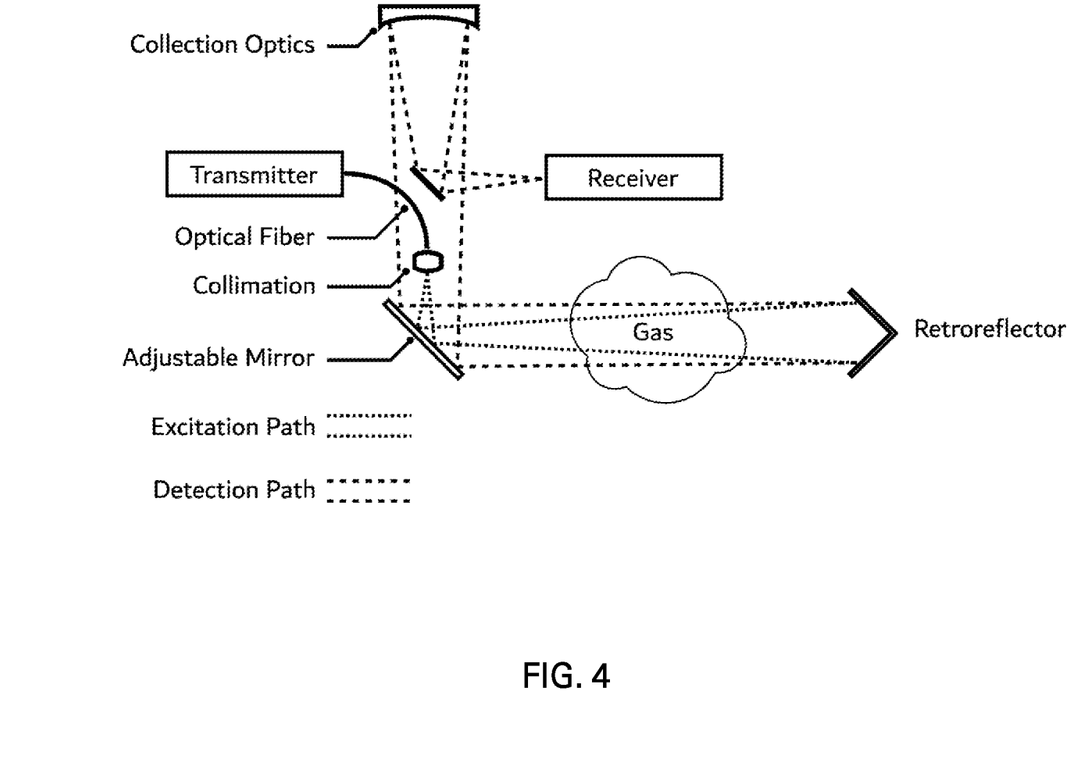
FIG. 4 shows an example of a gas detection system comprising gambling mirrors.

To mitigate these issues, a gas detection system can also be equipped with motorized gimbaling mirrors, as is shown in FIG. 4. However, such motorized gimbaling mirrors are associated with several cost. Unit cost, because the parts require complex electro-mechanical units and assembly. Installation costs, because the parts consume high power and require energy and supply infrastructure. Operational costs, since the solution is subject to a broader set of failure modes and requires maintenance as compared to solution without moving parts.

SUMMARY OF THE INVENTION

In view of the above-mentioned disadvantages, embodiments of the present invention aim to provide an improved gas detection system. In particular, an objective is to provide an optical alignment compensation system for a gas detection system. The optical alignment compensation system should be able to compensate misalignments, particularly a misalignment of a retroreflector, of the gas detection system. A goal is to increase the range of retroreflector positions, over which the gas detection system can provide a measurable signal and estimate the gas concentration accurately. Thereby, unit cost, as well as installation and maintenance costs should be kept low.

The objective is achieved by the embodiments of the invention provided in the enclosed independent claims. Advantageous implementations of these embodiments are defined in the dependent claims.

Embodiments of the invention provide an integrated solution of an optical alignment compensation system for a gas detection system, which enables maintaining alignment particularly between a sensor unit and a retroreflector, even under harsh and changing environmental conditions.

A first aspect of the invention provides an optical alignment compensation system for a gas detection system, the optical alignment system comprising: an array of transceiver pairs, wherein each transceiver pair is configured to transmit and receive light with an optical spectrum in an absorption region of a gas to be detected; a retroreflector arranged at a nominal position and configured to reflect the light; an optical element arranged and configured to direct the light from at least one of the transceiver pairs along an optical path through the gas to the retroreflector, to receive the light reflected by the retroreflector along the optical path, and to direct the reflected light to the respective transceiver pair; and a control unit configured to select one of the transceiver pairs for transmitting and receiving the light, wherein the control unit is configured to select the transceiver pair that receives the reflected light with the highest signal response.

The optical alignment compensation system is able to compensate a misalignment, e.g. drift, of the retroreflector. Thus, the range of retroreflector positions, over which the gas detection system can provide a measurable signal and estimate the gas concentration accurately, is increased. The alignment may be achieved electronically by addressing individually the multiple transceiver pairs and, in particular, by selecting by the control unit the transceiver pair with the highest signal response. At least for this transceiver pair, a proper alignment is given. The optical alignment compensation system of the first aspect does not require any external beam alignment components. A simple implementation of the optical alignment compensation system may involve two (or more) transceiver pairs.

Notably, the light may be laser light (for instance, the optical alignment compensation system may further comprise a laser), and may comprise a single wavelengths or may comprises multiple wavelengths. Further, the light may be coherent light in each case.

The transceiver pairs and the control unit may be part of a sensor unit of the optical alignment compensation system, and potentially of the gas detection system. The sensor unit may be integrated into an optical chip. The signal response of the light received by the transceiver pairs may be measured by a detector, which may also be part of the sensor unit, and the control unit may evaluate the signal response. The signal response, as e.g. measured by the detector, may correspond to a light intensity, in particular, if absorption spectroscopy is used by the gas detection system (as explained above in the background section). However, the signal response may also correspond to another physical quantity, if the mechanism of the gas detection system is different than absorption spectroscopy.

In an implementation of the optical alignment compensation system, the control unit is further configured to reselect one of the transceiver pairs, if the signal response of the reflected light received by the currently selected transceiver pair drops below a threshold.

In an implementation of the optical alignment compensation system, the control unit is configured to reselect the transceiver pair that receives the reflected light with the highest signal response.

The signal response may, for example, drop below the threshold, because the retroreflector drifted from its nominal position to another position (referred to as "drifted position"). In this case, the currently selected transceiver pair may not anymore provide the best alignment. Instead, the reselected transceiver pair shows the highest signal response and may thus provide the best alignment, for the retroreflector being at the drifted position.

In an implementation of the optical alignment compensation system, the control unit is configured to perform a search algorithm to identify the transceiver pair that receives the reflected light with the highest signal response; and the search algorithm comprises: a brute-force interrogation of transceiver pairs in conditions of lower signal responses of the reflected light received by the transceiver pairs; and/or a gradient descent based interrogating of transceiver pairs in conditions of higher signal responses of the reflected light received by the transceiver pairs.

The search algorithms may ensure that the selection of the transceiver pair is accurate and fast under all conditions.

In an implementation of the optical alignment compensation system, each transceiver pair is configured to transmit the light into a unique direction different than the other transceiver pairs, and to receive the light along the unique direction.

Since the unique direction is different for each transceiver pair, for each position of the retroreflector over a range of positions (including nominal and drifted positions), selecting one of the transceiver pairs leads to the best alignment.

In an implementation of the optical alignment compensation system, each transceiver pair comprises at least two apertures, the at least two apertures being designed for the optical spectrum of the light and for the unique direction of the respective transceiver pair.

In an implementation of the optical alignment compensation system, the transceiver pairs are arranged in a pattern in the array of transceiver pairs.

In an implementation of the optical alignment compensation system, the pattern is a uniformly spaced 2D grid; and/or the array is a 2D array.

Also another pattern may be chosen for arranging the transceiver pairs, for instance a pattern that matches more adaptively the projection of the optical element to a probabilistic misalignment model of the retroreflector, for example, in order to maximize Field of Regard (FoR).

In an implementation, the optical alignment compensation system further comprises an optical chip, wherein the array of transceiver pairs is integrated on the optical chip.

Thus, a small and easy to install solution for the system of first aspect is provided.

In an implementation, the optical alignment compensation system further comprises an optical switch matrix; wherein the control unit is configured to select the transceiver pair by electrically controlling the optical switch matrix.

The optical switch matrix enables the control unit to switch electrically the optical path for the light, i.e., to cause the light to be guided to and from the selected transceiver pair. A simple and fast switching is possible. Thus, the system can be re-aligned in case of a retroreflector drift.

In an implementation of the optical alignment compensation system, the optical switch matrix is integrated on the optical chip.

The optical chip may form a sensor unit of the optical alignment compensation system. The optical chip may include the array of transceiver pairs, and the switch matrix. In addition, the optical chip may include a laser or LED for generating the light, and/or may include a detector for detecting the received light, and/or may include the control unit, e.g., as a microprocessor.

In an implementation of the optical alignment compensation system, the optical switch matrix is configured to direct the light from an excitation port to the selected transceiver pair for transmission by the selected transceiver pair, and to direct reflected light received by the selected transceiver pair from the selected transceiver pair to a detection port.

The light, for instance laser light, can be coupled into the excitation port, and can be detected at the detection port (e.g., to analyze the presence or type of gas to be detected).

In an implementation of the optical alignment compensation system, the optical switch matrix is based on a cascade of Mach-Zehnder interferometers.

In this way, a very sensitive and precise switch matrix can be designed.

In an implementation of the optical alignment compensation system, the array of transceiver pairs is a 2D array; and the optical switch matrix comprises a plurality of electrically controllable row selector and column selector switches, for selecting the transceiver pair located in a specific row and a specific column in the 2D array.

In an implementation of the optical alignment compensation system, the at least one optical element comprises a lens or a lens system.

A second aspect of the invention provides an optical alignment compensation method for a gas detection system, the method comprising: selecting one transceiver pair, of an array of transceiver pairs, for transmitting and receiving light with an optical spectrum in an absorption region of a gas to be detected; directing, with an optical element, the light from the selected transceiver pair along an optical path through the gas to a retroreflector; and directing, with the optical element, the light reflected by the retroreflector along the optical path to the selected transceiver pair; wherein the selected transceiver pair is the transceiver pair that receives the reflected light with the highest signal response.

The method of the second aspect achieves the same advantages as the device of the first aspect and may be extended by respective implementations as described above for the optical alignment compensation system of the first aspect.

BRIEF DESCRIPTION OF THE DRAWINGS

The above described aspects and implementations are explained in the following description of embodiments with respect to the enclosed drawings.

DETAILED DESCRIPTION OF EMBODIMENTS OF THE INVENTION

Figure 5:
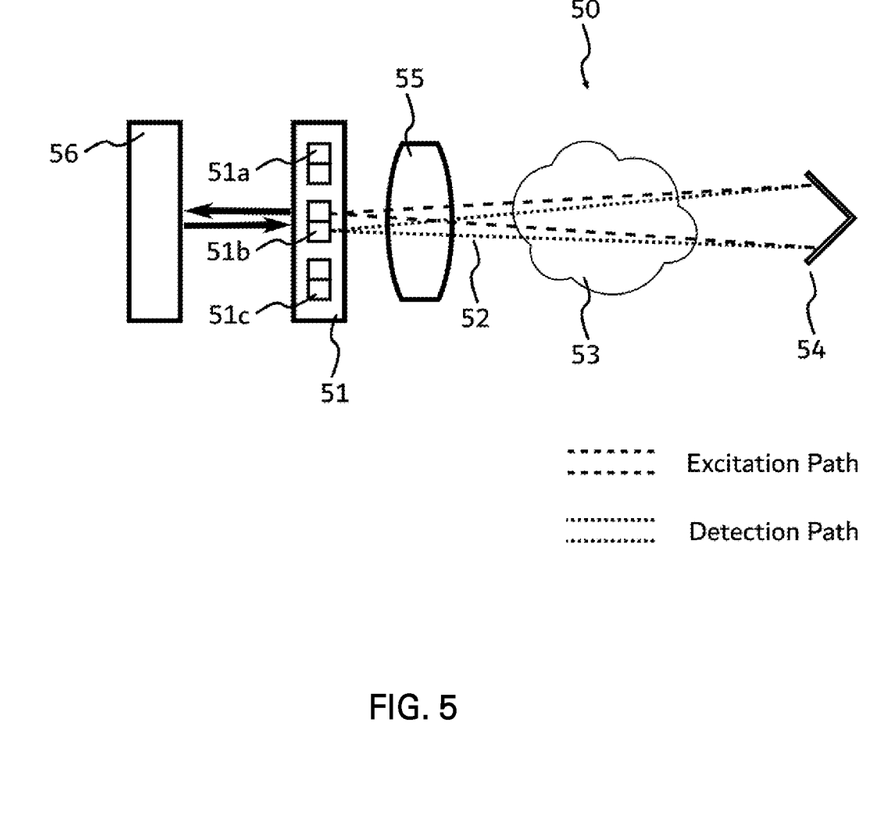
FIG. 5 shows an optical alignment compensation system for a gas detection system, according to an embodiment of the invention.

FIG. 5 shows an optical alignment compensation system 50 according to an embodiment of the invention. The compensation system 50 is suitable for a gas detection system, i.e. it can be a part of a gas detection system. In particular, it may function to align the gas detection system. Accordingly, the present disclosure also provides a gas detection system, which includes an optical alignment compensation system 50 as described in this disclosure. In particular, one or more such 30 compensation systems 50 can be included in the gas detection system.

Figure 7:
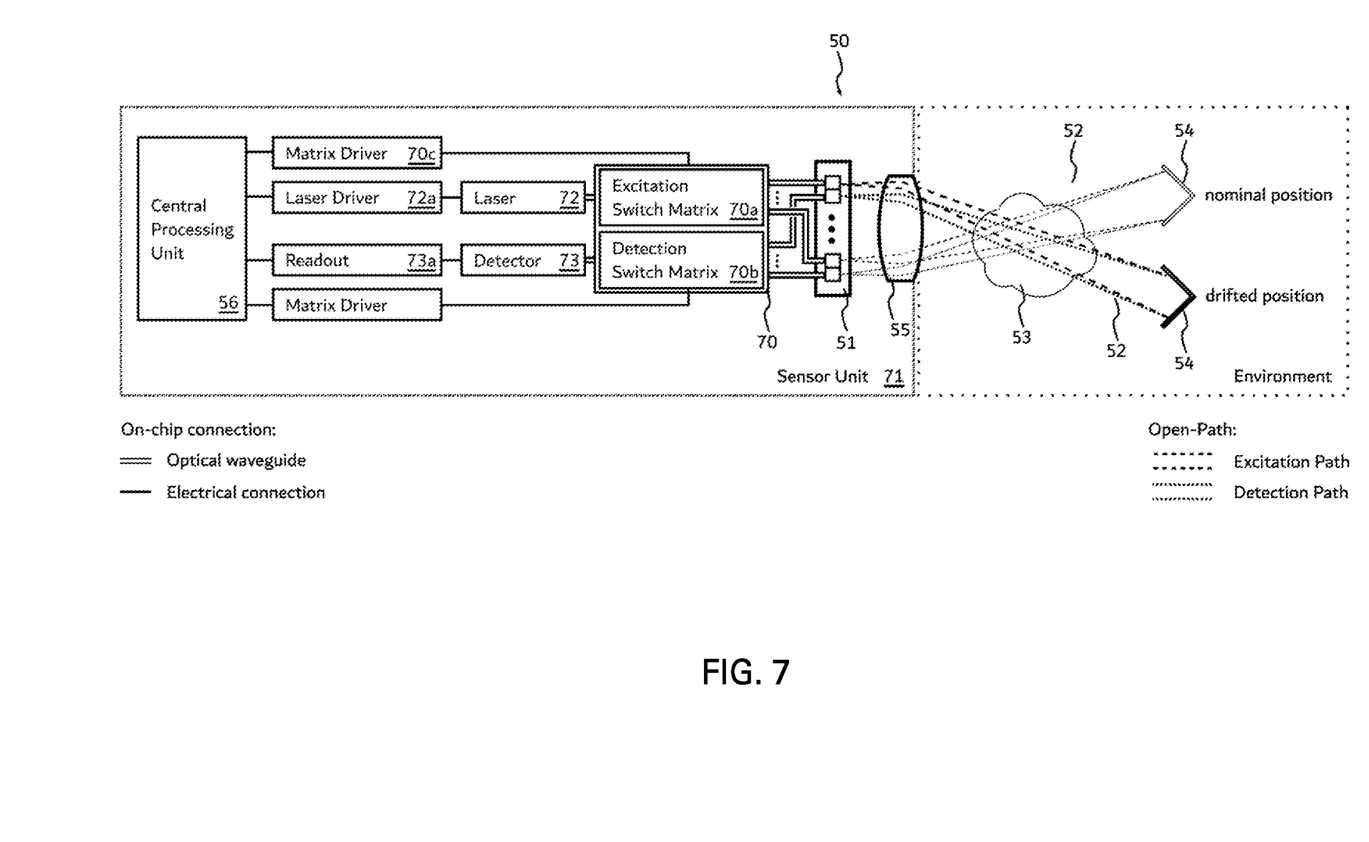
FIG. 7 shows an optical alignment compensation system for a gas detection system, according to an embodiment of the invention.

The optical alignment compensation system 50 shown in FIG. 5 comprises an array 51 of transceiver pairs 51a, 51b, 51c (here exemplarily three transceiver pairs are shown, however, the array may generally comprise two or more such transceiver pairs). Each of the transceiver pairs 51a, 51b, 51c of the array 51 is configured to transmit and receive light 52, for instance laser light (single-wavelength or multi-wavelength; e.g. provided by a laser 72 as shown in FIG. 7) with an optical spectrum (i.e., a specific distribution of one or more wavelengths) in an absorption region of a gas 53 to be detected. For instance, the gas 53 may be methane. The array 51 of transceiver pairs 51a, 51b, 51c may form a sensor unit (see as example the sensor unit 71 in FIG. 7), or may be part of a sensor unit of the compensation system 50, and/or of a sensor unit of the gas detection system.

Further, the optical alignment compensation system 50 comprises a retroreflector 54, which is arranged at a nominal position (at least initially) and is configured to reflect the light 52. The nominal position may be the position of installation of the retroreflector 54. As will be described below, the retroreflector 54 should not drift from this nominal position, but such drift from the nominal position to a drifted position may be unavoidable under certain environmental conditions and/or over a long time period.

Further, the optical alignment compensation system 50 comprises an optical element 55, which is arranged and configured to direct the light 52 from at least one of the transceiver pairs 51a, 51b, 51c (here exemplarily from the transceiver pair 51b) along an optical path through the gas 53 and to the retroreflector 54. This direction of the optical path may correspond to an excitation path of the light 52 through the gas 53. Further, the optical element 55 is also configured to receive the light 52 reflected by the retroreflector 54 along the optical path, and to direct the reflected light 52 to the respective transceiver pair 51a, 51b, 51c (here again the transceiver pair 51b). This direction of the optical path may correspond to a detection path of the light 52 through the gas 53. The excitation path of the light 52 may be the light path before or during excitation of the gas (leading to absorption), and the detection path of the light 52 may be the light path after excitation of the gas (i.e., the remaining light 52 after absorption).

Further, the optical alignment compensation system 50 comprises a control unit 56, for instance, a processor, which may be coupled to a memory including instructions for executing a program by the processor. The control unit is configured to select one of the transceiver pairs 51a, 51b, 51c for transmitting and receiving the light 52, wherein the control unit 56 is configured to select the transceiver pair 51a, 51b, 51c that receives the reflected light 52 with the highest signal response. The control unit 56 may be part of the sensor unit mentioned above. The signal response may be measured by a detector (see as example the detector 73 shown in FIG. 7), which may be coupled to the control unit 56 that evaluates the signal response, wherein the detector 73 may receive the reflected light 52 from the transceiver pair 51a, 51b, 51c.

The control unit 56 may comprise processing circuitry, wherein the processing circuitry comprises one or more processors and memory, e.g., a non-transitory memory, which is connected to the one or more processors. The memory may carry executable program code, which, when executed by the one or more processors, may cause the control unit 56 to perform the selection, or a reselection, of the transceiver pair 51a, 51b, 51c that receives the reflected light 52 with the highest signal response.

As shown in FIG. 5, for the nominal position of the retroreflector 54, the selected transceiver pair 51a, 51b, 51c is exemplarily the transceiver pair 51b. The retroreflector 54 may, however, drift, for instance, due to changing environmental conditions, for example, changing temperature, pressure or the like. In this case the retroreflector 54 may be located at a drifted position, and the selected transceiver pair 51a, 51b, 51c in this case would be another one, e.g. exemplarily the transceiver pair 51a or 51c.

Figure 6:
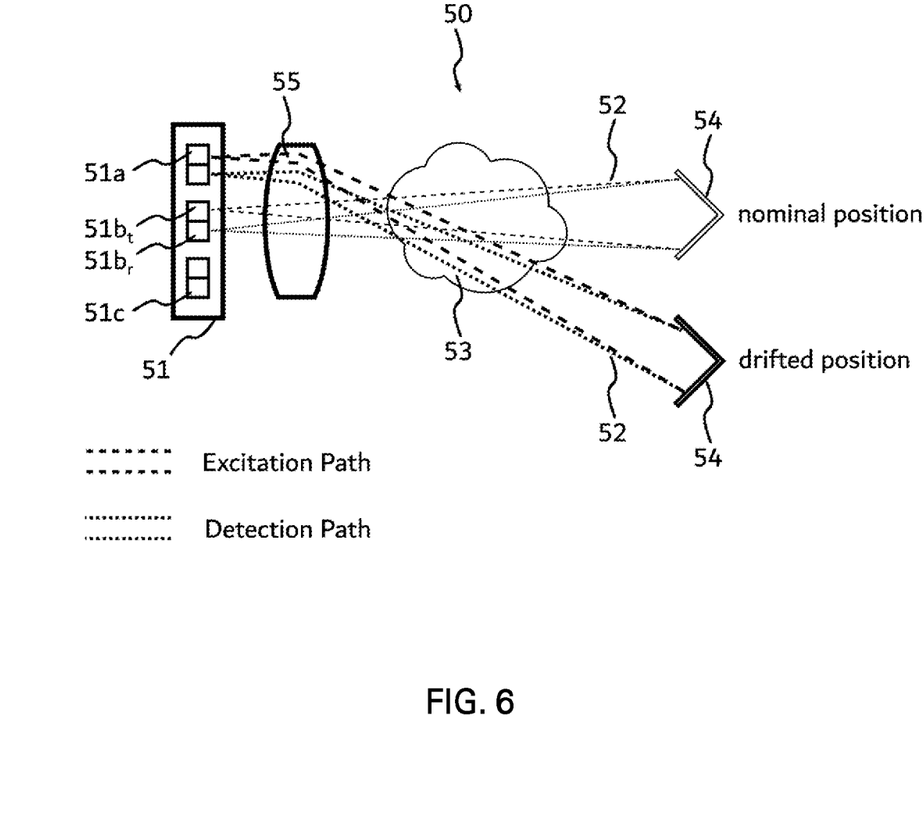
FIG. 6 shows an optical alignment compensation system for a gas detection system, according to an embodiment of the invention.

FIG. 6 shows in this respect an optical alignment compensation system 50 according to an embodiment of the invention, which builds on the embodiment shown in FIG. 5. Same elements are labelled with same reference signs and may be implemented likewise.

FIG. 6 shows that the retroreflector 54 may drift from the nominal position to a drifted position. FIG. 6 also shows that for the nominal position the transceiver pair 51b (comprising a receiver 51b, and a transmitted 51b,) may exemplarily be the selected transceiver pair. However, for the drifted position, the transceiver pair 51a is the selected transceiver pair. Accordingly, the control unit 56 is able to reselect the transceiver pair 51a, 51b, 51c. The excitation and detection path of the light 52 changes accordingly with the reselection as shown.

In particular, the control unit 56 is configured to reselect the transceiver pair 51a, 51b, 51c (here exemplarily the transceiver pair 51a) that receives the reflected light 52 with the highest signal response. For instance, if the currently reflected transceiver pair (here the transceiver pair 51b) does not receive the reflected light 52 with the highest signal response. The control unit may reselect one of the transceiver pairs 51a, 51b, 51c, if the signal response of the reflected light 52 received by the currently selected transceiver pair (here 51b) drops below a threshold. The threshold may be absolute or relative to the other signal responses.

The control unit 56 may use a search algorithm to identify the selected (or reselected) transceiver pair 51a, 51b, 51c. The search-algorithm can have different implementations. For instance, in condition of poor signal quality, which only requires a global optimization and search in the direction space, brute-force interrogation of all possible transceiver pairs 51a, 51b, 51c and identification of maximum signal strength can be used. For instance, in condition of sufficient signal quality, which only requires only a local optimization, gradient descent can be implemented by interrogating only neighboring transceiver pairs 51a, 51b, 51c, evaluating finite differences in signal strength and inferring next optimal subset of transceivers to interrogate.

FIG. 7 shows an optical alignment compensation system 50 according to another embodiment of the invention, which builds on the embodiments shown in FIG. 5 and FIG. 6. Same elements are labelled with same reference signs and may be implemented likewise. In particular, FIG. 7 shows particularly a block schematic of a laser gas detection system with integrated misalignment compensation.

FIG. 7 shows that the control unit 56 may be a central processing unit, and that the control unit 56 and the array 51 of transceiver pairs 51a, 51b, 51c may be part of a sensor unit 71. The sensor unit 71 may be an optical chip, wherein the array 51 may be integrated on the optical chip, and also the control unit 56 may be integrated on the optical chip.

The optical alignment compensation system 50 may further comprise an optical switch matrix 70, which may also be part of the sensor unit 71 (e.g., may be integrated on the optical chip). The optical switch matrix 70 may be composed of an excitation switch matrix 70a and a detection switch matrix 70b. The control unit 56 is configured to select the transceiver pair 51a, 51b, 51c by electrically controlling the optical switch matrix 70. The control unit 56 may control the switch matrix 70 via a matrix driver 70c.

The optical alignment compensation system 50 may further comprise a laser 72 for generating the light 52. The laser 72 may provide the light 52 to the optical switch matrix 70 (e.g., a part referred to as "excitation switch matrix") and from there to the selected transceiver pair 51a, 51b, 51c (the transmitter thereof). The laser 72 may be driven by a laser driver 72a, which may be controlled by the control unit 56.

The optical alignment compensation system 50 may further comprise a detector 73 for detecting the reflected light 52. The detector 73 may receive the light 52 from the optical switch matrix 70 (e.g., a part referred to as "detection switch matrix"), which may receive it from the selected transceiver pair 51a, 51b, 51c (the receiver thereof). The detector 73 may be operated by a readout circuitry 73a, which may be controlled by the control unit 56.

Notably, in FIG. 5, FIG. 6 and FIG. 7, the at least one optical element 55 may comprises a lens or a lens system.

Figure 8:
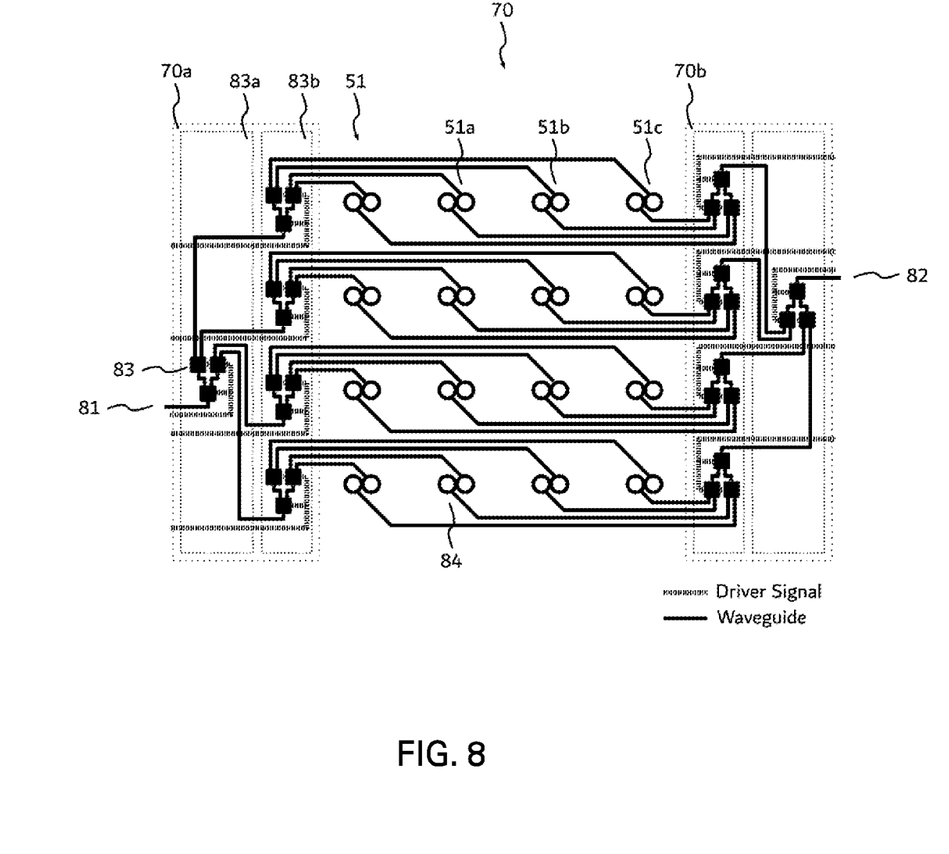
FIG. 8 shows an optical switch matrix of an optical alignment compensation system for a gas detection system according to an embodiment of the invention.

FIG. 8 shows a more detailed view of an example of an optical switch matrix 70 of an optical alignment compensation system 50 according to an embodiment of the invention.

The optical switch matrix 70 may be composed of an excitation switch matrix 70a and a detection switch matrix 70b. The excitation switch matrix may direct the light 52 from an excitation port 81 to the selected transceiver pair 51a, 51b, 51c (transmitter). The excitation port 81 may be coupled 30 to a laser 72. The detection switch matrix may direct the light 52 from the selected transceiver pair 51a, 51b, 51c (receiver) to a detection port 82. The detection port 82 may be coupled to a detector 73. Used together, the excitation switch matrix and the detection switch matrix allow to route electronically excitation and detection paths to individual transceiver pairs 51a, 51b, 51c.

A possible implementation of the optical switch matrix can be based on a cascade of on-chip thermo-optic Mach-Zehnder interferometers, actuated by thermal resistors.

FIG. 8 shows, for an exemplary case that the array 51 of transceiver pairs 51a, 51b, 51c is a 2D array, that the optical switch matrix 70 comprises a plurality of electrically controllable switches 83. These switches are arranged in cascade with a row selector 83a and column selector 83b for selecting a transceiver pair 51a, 51b, 51c located in a specific row and a specific column in the 2D array 51.

FIG. 8 also shows that each transceiver pair 51a, 51b, 51c of the array 51 may comprise at least two apertures 84. These at least two apertures 84 may be specifically designed for the optical spectrum of the light 12, and/or for the unique direction of the respective transceiver pair 51a, 51b, 51c (into which the light 52 is transmitted, or from which the light 52 is received, by this pair).

Figure 9:
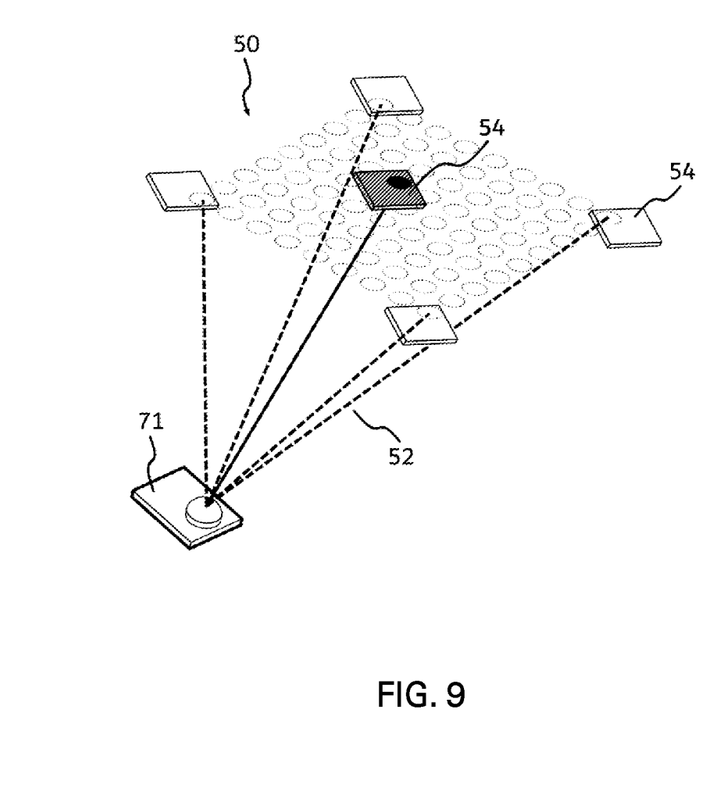
FIG. 9 shows schematically a working principle of an optical alignment compensation system for a gas detection system, according to an embodiment of the invention.

FIG. 9 shows a principle of operation on optical alignment compensation system 50 according to an embodiment of the invention. In particular, FIG. 9 shows the sensor unit 71 and the retroreflector 54 of the compensation system 50. FIG. 9 shows that the retroreflector 54 has a physical reflector size, and that it can drift to different positions (e.g., from the nominal position). At each position, the sensor unit 71 can be aligned with the retroreflector 54 (by selecting the proper transceiver pair 51, 51b, 51c to transmit and receive the light 52). Thus, by compensating the drift, the effective reflector size can be increased.

In the embodiments of the compensation system 50 shown in FIG. 5-9, each transceiver pair 51a, 51b, 51c may comprise two grating couplers, which may specifically be designed for a given wavelength (spectrum of the light 52) and outcoupling angle (unique direction). Each transceiver pair 51a, 51b, 51c may further be combined with the optical element 55 (e.g. a lens system) to direct the light 52 from an optical chip, into which the array 51 is integrated, along a unique direction in space to the retroreflector 54, and to collect the reflected light 54 light back into the optical chip from a direction (almost) identical to the outward beam.

Thus, the excitation and detection direction (path) through the gas 53 may be identical, because the transmitter and receiver of the transceiver pair 51a, 51b, 51c are positioned very close by in space and may be realized on-chip, e.g. using Very Large Scale Integration (VLSI) semiconductor processes.

Figure 10:
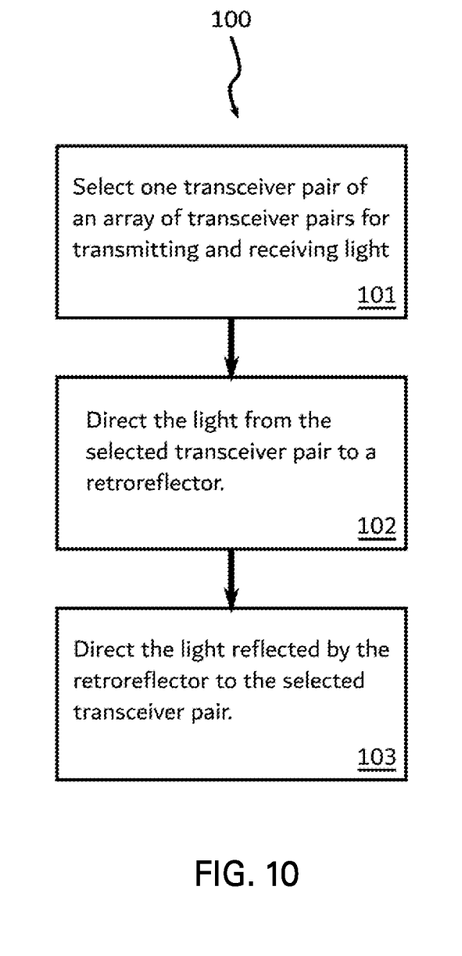
FIG. 10 shows an optical alignment compensation method for a gas detection system, according to an embodiment of the invention.

FIG. 10 shows a flow chart of a method 100 according to an embodiment of the invention. The method 100 can be performed by the optical alignment compensation system 50. The method 100 is thus an alignment compensation method 100 for a gas detection system.

The method 100 comprises a step 101 of selecting one transceiver pair 51a, 51b, 51c of an array 51 of transceiver pairs 51a, 51b, 51c, for transmitting and receiving light 52 with an optical spectrum in an absorption region of a gas 53 to be detected. Further, a step 102 of directing, with an optical element 55, the light 52 from the selected transceiver pair 51a, 51b, 51c along an optical path through the gas 53 to a retroreflector 54. Further, a step 103 of directing, with the optical element 55, the light 52 reflected by the retroreflector 54 along the optical path to the selected transceiver pair 51a, 51b, 51c. The selected transceiver pair 51a, 51b, 51c is the transceiver pair 51a, 51b, 51c that receives the reflected light 52 with the highest signal response.

In summary, an integrated solution for a gas detection system with optical alignment compensation system 50 is proposed, which facilitates to maintain the alignment of a sensor unit 71. The alignment is achieved electronically by addressing multiple transceiver pairs 51a, 51b, 51c. External beam alignment components are not required.

The misalignment or drift compensation enlarges the set of retroreflector 54 positions, over which the sensor unit 71 can provide a measurable signal and e.g. estimate the gas concentration. Increasing the sensor tolerance to misalignment can be also interpreted as an increase in the effective area of the retroreflector 54 (see FIG. 9). Using semiconductor manufacturing methods may enable integrating and addressing a large number of transceiver pairs 51a, 51b, 51c on an optical chip within the same sensor unit with higher cost efficiency compared to the assembling of discrete components.

Unit cost as well as installation and maintenance costs can be reduced. Unit costs can be reduced, since a solid-state integrated solution requires a simpler assembly compared to a solution with moving parts. The assembly steps are replaced by semiconductor fabrication processes, which scale favorably with high volumes. Installation cost can be reduced, since smaller size retroreflectors 54 can be fabricated, transported, installed, cleaned or replaced. Finally, maintenance costs can be reduced because the number of system components is reduced, which leads to simpler troubleshooting and maintenance. Furthermore, environmental disturbances are compensated and rejected, manual intervention for alignment is reduced or eliminated, and a mean time between failures for the integrated solid-state solution is longer compared to the one of a sensor where misalignment compensation is achieved with moving parts.

The invention claimed is:

1. An optical alignment compensation system (50) for a gas detection system for detecting a gas, the optical alignment system (50) comprising:
    an array (51) of transceiver pairs (51a, 51b, 51c), wherein each transceiver pair (51a, 51b, 51c) is configured to transmit and receive light (52) with an optical spectrum in an absorption region of the gas (53) to be detected;
    a retroreflector (54) arranged at a nominal position and configured to reflect the light (52);
    an optical element (55) arranged and configured to direct the light (52) from at least one of the transceiver pairs (51a, 51b, 51c) along an optical path through the gas (53) to the retroreflector (54), to receive the light (52) reflected by the retroreflector (54) along the optical path, and to direct the reflected light (52) to the respective transceiver pair (51a, 51b, 51c); and
    a control unit (56) configured to select one of the transceiver pairs (51a, 51b, 51c) for transmitting and receiving the light (52), wherein the control unit (56) is configured to perform a search algorithm to identify the transceiver pair (51a, 51b, 51c) that receives the reflected light (52) with the highest signal response and to select said transceiver pair (51a, 51b, 51c),
    wherein the search algorithm comprises
        a brute-force interrogation of transceiver pairs (51a, 51b, 51c) in conditions of lower signal response of the reflected light (52) received by the transceiver pairs (51a, 51b, 51c),
        a gradient descent based interrogating of transceiver pairs (51a, 51b, 51c) in conditions of higher signal responses of the reflected light (52) received by the transceiver pairs (51a, 51b, 51c).

2. The optical alignment compensation system (50) according to claim 1, wherein:
    the control unit (56) is further configured to reselect one of the transceiver pairs (51a, 51b, 51c), if the signal response of the reflected light (52) received by the currently selected transceiver pair (51a, 51b, 51c) drops below a threshold.

3. The optical alignment compensation system (50) according to claim 2, wherein:
    the control unit (56) is configured to reselect the transceiver pair (51a, 51b, 51c) that receives the reflected light (52) with the highest signal response.

4. The optical alignment compensation system (50) according to claim 1, wherein:
    each transceiver pair (51a, 51b, 51c) is configured to transmit the light (52) into a unique direction different than the other transceiver pairs (51a, 51b, 51c), and to receive the light (52) along the unique direction.

5. The optical alignment compensation system (50) according to claim 4, wherein:
    each transceiver pair (51a, 51b, 51c) comprises at least two apertures, the at least two apertures being designed for the optical spectrum of the light (52) and for the unique direction of the respective transceiver pair (51*a*, 51*b*, 51*c*).

6. The optical alignment compensation system (50) according to claim 1, wherein:
the transceiver pairs (51*a*, 51*b*, 51*c*) are arranged in a pattern in the array of transceiver pairs (51*a*, 51*b*, 51*c*), and
the pattern is a uniformly spaced 2D grid; and/or
the array (51) is a 2D array.

7. The optical alignment compensation system (50) according to claim 1, comprising:
an optical chip, wherein the array (51) of transceiver pairs (51*a*, 51*b*, 51*c*) is integrated on the optical chip.

8. The optical alignment compensation system (50) according to claim 7, further comprising:
an optical switch matrix (70);
wherein the control unit (56) is configured to select the transceiver pair (51*a*, 51*b*, 51*c*) by electrically controlling the optical switch matrix (70).

9. The optical alignment compensation system (50) according to claim 8, wherein:
the optical switch matrix (70) is integrated on the optical chip.

10. The optical alignment compensation system (50) according to claim 8, wherein:
the optical switch matrix (70) is configured to direct the light (52) from an excitation port (81) to the selected transceiver pair (51*a*, 51*b* 51*c*) for transmission by the selected transceiver pair (51*a*, 51*b*, 51*c*), and to direct reflected light (52) received by the selected transceiver pair (51*a*, 51*b*, 51*c*) from the selected transceiver pair (51*a*, 51*b*, 51*c*) to a detection port (82).

11. The optical alignment compensation system (50) according to claim 8, wherein:
the optical switch matrix (70) is based on a cascade of Mach-Zehnder interferometers.

12. The optical alignment compensation system (50) according to claim 11, wherein:
the array (51) of transceiver pairs (51*a*, 51*b*, 51*c*) is a 2D array; and
the optical switch matrix (70) comprises a plurality of electrically controllable row selector and column selector switches (83), for selecting the transceiver pair (51*a*, 51*b*, 51*c*) located in a specific row and a specific column in the 2D array (51).

13. The optical alignment compensation system (50) according to claim 1, wherein:
the optical element (55) comprises a lens or a lens system.

14. An optical alignment compensation method (100) for a gas detection system for detecting a gas, the method (100) comprising:
performing, with a control unit (56), a search algorithm to identify one transceiver pair (51*a*, 51*b*, 51*c*), of an array (51) of transceiver pairs (51*a*, 51*b*, 51*c*), for transmitting and receiving light (52) with an optical spectrum in an absorption region of the gas (53) to be detected;
selecting (101), with the control unit (56), said transceiver pair (51*a*, 51*b*, 51*c*);
directing (102), with an optical element (55), the light (52) from the selected transceiver pair (51*a*, 51*b*, 51*c*) along an optical path through the gas (53) to a retroreflector (54); and
directing (103), with the optical element (55), the light (52) reflected by the retroreflector (54) along the optical path to the selected transceiver pair (51*a*, 51*b*, 51*c*);
wherein the selected transceiver pair (51*a*, 51*b*, 51*c*) is the transceiver pair (51*a*, 51*b*, 51*c*) that receives the reflected light (52) with the highest signal response, and
wherein the search algorithm comprises
a brute-force interrogation of transceiver pairs (51*a*, 51*b*, 51*c*) in conditions of lower signal response of the reflected light (52) received by the transceiver pairs (51*a*, 51*b*, 51*c*),
a gradient descent based interrogating of transceiver pairs (51*a*, 51*b*, 51*c*) in conditions of higher signal responses of the reflected light (52) received by the transceiver pairs (51*a*, 51*b*, 51*c*).

* * * * *